(12) United States Patent
Shoemaker

(10) Patent No.: US 7,077,417 B2
(45) Date of Patent: Jul. 18, 2006

(54) CONNECTING DEVICE

(75) Inventor: Craig Shoemaker, Fergus (CA)

(73) Assignee: Iron Concepts Ltd., Waterloo (CA)

( * ) Notice: Subject to any disclaimer, the term of this patent is extended or adjusted under 35 U.S.C. 154(b) by 3 days.

(21) Appl. No.: 10/883,658

(22) Filed: Jul. 6, 2004

(65) Prior Publication Data

US 2006/0006627 A1 Jan. 12, 2006

(51) Int. Cl.
*B60D 1/04* (2006.01)

(52) U.S. Cl. ..................................... 280/506; 280/504

(58) Field of Classification Search ................ 280/506, 280/504
See application file for complete search history.

(56) References Cited

U.S. PATENT DOCUMENTS

| | | | |
|---|---|---|---|
| 4,040,641 A | 8/1977 | Riecke | |
| 5,333,888 A * | 8/1994 | Ball | ............................ 280/504 |
| 5,423,566 A | 6/1995 | Warrington et al. | |
| 5,593,172 A | 1/1997 | Breslin | |
| 5,685,686 A * | 11/1997 | Burns | ........................ 414/462 |
| 5,988,667 A | 11/1999 | Young | |
| 6,105,989 A | 8/2000 | Linger | |
| 6,131,938 A | 10/2000 | Speer | |
| 6,142,502 A | 11/2000 | Breslin | |
| 6,502,845 B1 * | 1/2003 | Van Vleet | ................ 280/491.1 |
| 6,598,897 B1 * | 7/2003 | Patti | ............................ 280/507 |
| 6,835,021 B1 * | 12/2004 | McMillan | ................ 403/374.4 |
| 2002/0047249 A1 | 4/2002 | McCoy et al. | |

\* cited by examiner

*Primary Examiner*—Lesley D. Morris
*Assistant Examiner*—Marlon Arce-Diaz

(57) ABSTRACT

A connecting device for connecting an accessory to a hitch receiver with an outward end defining an opening. The connecting device has a base with a body portion receivable in the hitch receiver. The body portion is adapted for coupling with the hitch receiver to locate the base in a predetermined position thereon. The connecting device also has a collar for engaging the outward end of the hitch receiver in an interference fit upon engagement of the collar with the outward end, the collar being coupled with the accessory. In addition, the connecting device includes a fastener operatively connected with the base for urging the collar against the outward end to cause the collar to engage the outward end. The connecting device connects the accessory to the hitch receiver upon engagement of the collar with the outward end of the hitch receiver.

12 Claims, 4 Drawing Sheets

CONNECTING DEVICE

FIELD OF THE INVENTION

This invention is related to a connecting device for connecting an accessory to a hitch receiver.

BACKGROUND OF THE INVENTION

Hitch receivers are commonly used for attaching accessories to vehicles. The accessories are bicycle racks, cargo baskets, or various carriers and the like, and they are usually attached to a vehicle at its back end. Typically, a hitch receiver is a tube which is substantially square in cross-section (often with rounded corners) and attached to the vehicle beneath a rear bumper. The accessory is typically intended to support and hold one or more bicycles, cargo, or other similar articles.

The typical hitch receiver is ideal for supporting the typical accessory because the hitch receiver is located at the back end of the vehicle and is securely attached to the vehicle. For example, the hitch receiver is commonly welded or otherwise secured to a chassis or frame of the vehicle.

Various devices for connecting an accessory to a hitch receiver are known, but such devices suffer from a number of imperfections or weaknesses. Many of these imperfections arise because of the requirements that the connecting device should be easy to insert into the hitch receiver, and easy to attach securely to the hitch receiver after insertion. For example, accessories connected to hitch receivers by known devices tend to wobble relative to the hitch receiver (and the vehicle) as the vehicle travels, even where the connection is relatively secure. If not secured again to the hitch receiver after wobbling starts, the connecting device can gradually become less secure, even to the extent of disconnection. In addition, wobbling movement of the accessory relative to the hitch receiver can lead to the bicycles or other cargo on the accessory being jarred loose, and falling off the accessory. Also, known connecting devices do not provide for relatively fast and simple disconnection of the accessory from the hitch receiver.

Clamps and similar fasteners are often used to minimize movement of the accessory relative to the hitch receiver. However, these known clamps usually operate to secure the accessory to any two of four sides of the hitch receiver, so these clamps permit movement of the accessory relative to the hitch receiver in two directions.

There is therefore a need for an improved connecting device for connecting an accessory to a hitch receiver.

SUMMARY OF THE INVENTION

In one of its aspects, the invention provides a connecting device for connecting an accessory to a hitch receiver with an outward end defining an opening. The connecting device has a base, a collar, and a fastener. The base includes a body portion receivable in the hitch receiver. The body portion is adapted for coupling with the hitch receiver to locate the base in a predetermined position therein. The collar is for engaging the outward end of the hitch receiver in an interference fit upon engagement of the collar with the outward end, the collar being coupled with the accessory. The fastener is operatively connected with the base for urging the collar against the outward end to cause the collar to engage the outward end. Accordingly, the connecting device connects the accessory to the hitch receiver upon engagement of the collar with the outward end of the hitch receiver.

In another aspect, the collar includes a stop portion for stopping movement of the collar inwardly into the outward end.

In yet another aspect, the collar is adapted to engage the outward end substantially along a periphery edge disposed around the opening in an interference fit when the collar is urged against the outward end.

In another aspect of the invention, the fastener is operable to come into frictional driving contact with the accessory for urging the collar against the outward end of the hitch receiver.

In another aspect, the fastener is operable to disengage from the accessory to release the collar from engagement with the outward end of the hitch receiver.

In yet another aspect, the base includes a threaded bolt portion extending from the body portion so that at least a part of the threaded bolt portion projects beyond the outward end of the hitch receiver when the body portion is coupled to the hitch receiver. Also, the fastener includes a nut threadably engageable with the bolt portion for urging the collar against the outward end of the hitch receiver when the nut is moved inwardly on the bolt portion, to engage the collar with the outward end in an interference fit, and for loosening the collar when the nut is moved outwardly on the bolt portion, to disengage the collar from the outward end. The connecting device is in an assembled state when the nut is on the bolt portion and the collar is disengaged from the outward end.

In another of its aspects, the bolt portion includes a distal end positioned distal to the body portion, and the distal end includes a retaining pin hole therein. Also, the connecting device additionally includes a retaining pin receivable in the retaining pin hole, for retaining the nut on the bolt portion between the body portion and the retaining pin.

In another of its aspects, the invention includes a collar for securing an accessory to a hitch receiver with an outward end defining an opening. The collar has an interior part configured to fit inside the opening, and an exterior part extending outside the outward end from the interior part when the collar is urged inwardly against the outward end for engaging the outward end. The exterior part prevents inward movement of the collar upon engagement thereof. The collar is adapted to be coupled with the accessory so that the accessory is secured to the hitch receiver upon the engagement of the collar to the outward end of the hitch receiver.

In yet another aspect, the exterior part is adapted to engage the outward end substantially along a periphery edge disposed around the opening in an interference fit when the collar engages the outward end.

BRIEF DESCRIPTION OF THE DRAWINGS

The invention will be better understood with reference to the attached drawings, in which.

DETAILED DESCRIPTION OF THE PREFERRED EMBODIMENT(S)

Figure 3:
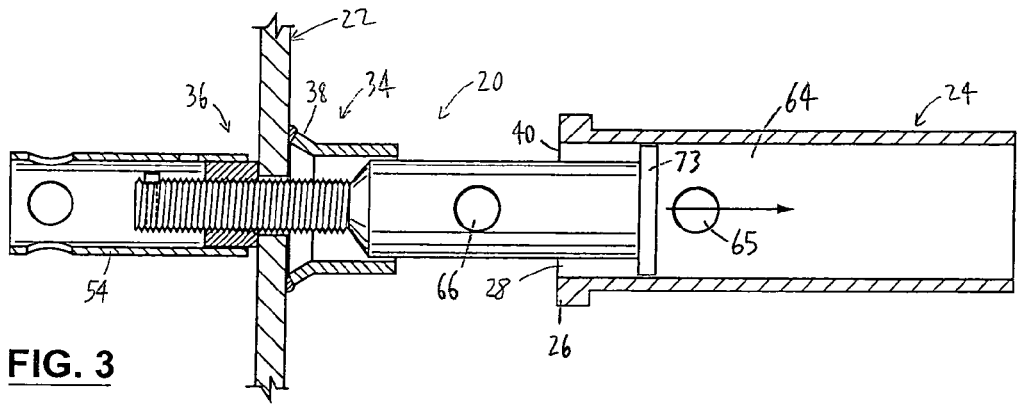
FIG. 3 is a side view of a base of the connecting device of FIG. 1 inserted in the hitch receiver, including a partial cross-section.
Figure 4:
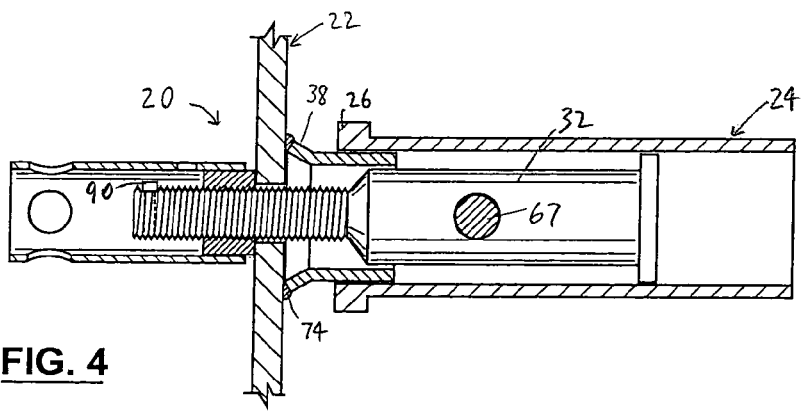
FIG. 4 is a side view of the connecting device of FIG. 1 with the base thereof coupled with the hitch receiver, including a partial cross-section.
Figure 5:
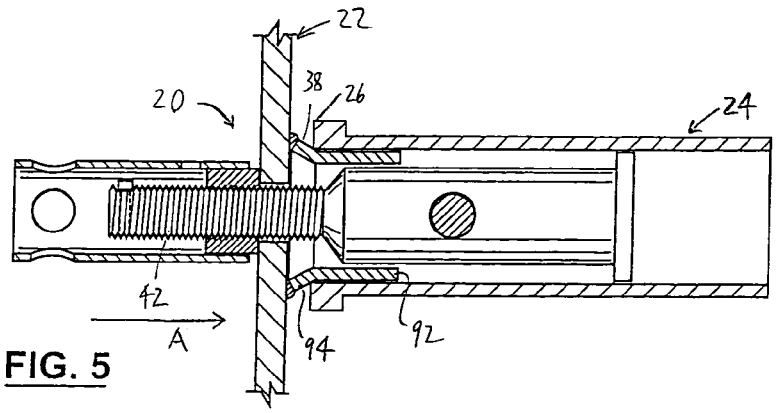
FIG. 5 is a side view of a collar of the connecting device of FIG. 1 engaged in an interference fit with an outward end of the hitch receiver, including a partial cross-section.
Figure 6:
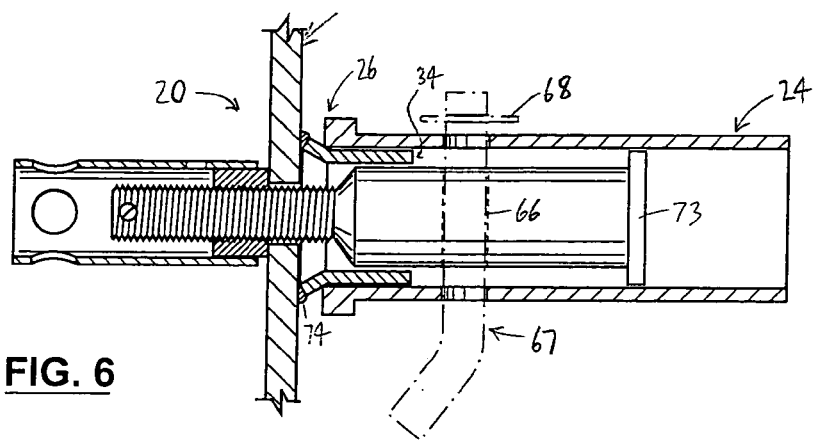
FIG. 6 is a top view of the connecting device of FIG. 5 with the collar engaged with the outward end of the hitch receiver, including a partial cross-section.

Reference is first made to FIGS. 1–6 to describe a preferred embodiment of a connecting device in accordance with the invention indicated generally by the numeral 20. The connecting device is for connecting an accessory 22 to a hitch receiver 24 which has an outward end 26 defining an opening 28. As shown in FIGS. 1, 3, 4, and 6, the connecting device 20 includes a base 30 with a body portion 32 receivable in the hitch receiver 24. The body portion 32 is adapted for coupling with the hitch receiver 24 to locate the base 30 in a predetermined position therein, as will be described. The connecting device 20 also includes a collar 34 for engaging the outward end 26 of the hitch receiver 24 in an interference fit upon engagement of the collar 34 with the outward end 26, as shown in FIGS. 5 and 6. The collar 34 is preferably coupled with the accessory 22. In addition, the connecting device includes a fastener 36 operatively connected with the base 30 and operable to urge the collar 34 against the outward end 26 so that the collar 34 engages the outward end 26, as will be described. Accordingly, the connecting device 20 connects the accessory 22 to the hitch receiver 24 upon engagement of the collar 34 with the outward end 26 of the hitch receiver 24.

As can be seen in FIGS. 2–6, the collar 34 preferably includes a stop portion 38 for stopping movement of the collar 34 inwardly, into the outward end 26 of the hitch receiver 24.

Figure 1:
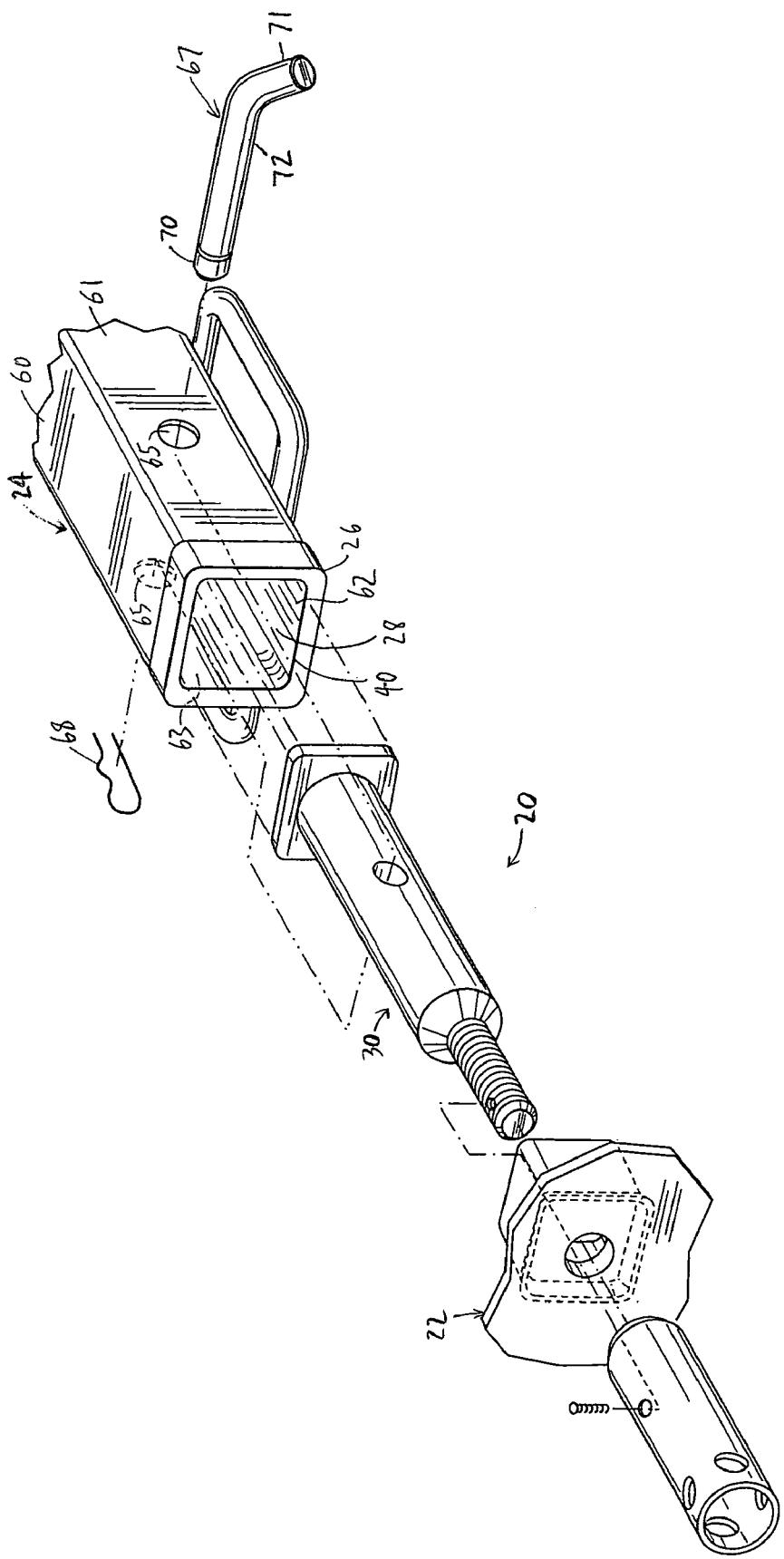
FIG. 1 is an exploded isometric view of a preferred embodiment of the connecting device of the invention and a hitch receiver.

As can be seen in FIG. 1, the hitch receiver 24 includes a periphery edge 40 around the opening 28. The collar 34 is preferably adapted to engage the outward end 26 along substantially the entire periphery edge 40 in an interference fit when the fastener 36 urges the collar 34 against the outward end 26. Preferably, the fastener 36 is operable to come into frictional driving contact with the accessory 22 for urging the collar 34 against the outward end 26 of the hitch receiver 24. In addition, the fastener 36 is preferably operable to disengage from the accessory 22 for releasing the collar 34 from engagement with the outward end 26 of the hitch receiver 24.

In the preferred embodiment, the base 30 includes a threaded bolt portion 42 extending from the body portion 32 so that at least a part of the threaded bolt portion 42 projects beyond the outward end 26 when the body portion 32 is coupled to the hitch receiver 24. As can be seen in FIGS. 2–6, the fastener 36 preferably includes a nut which is threadably engageable with the bolt portion 42 for urging the collar 34 against the outward end 26 of the hitch receiver 24. In particular, when the nut 36 is moved inwardly on the bolt portion 42, the nut 36 pushes the collar 34 towards the outward end 26, so that the collar 34 ultimately engages the outward end 26 in an interference fit. The nut 36 also loosens the engagement of the collar 34 with the outward end 26, when the nut 36 is moved outwardly on the bolt portion 42.

Figure 2:
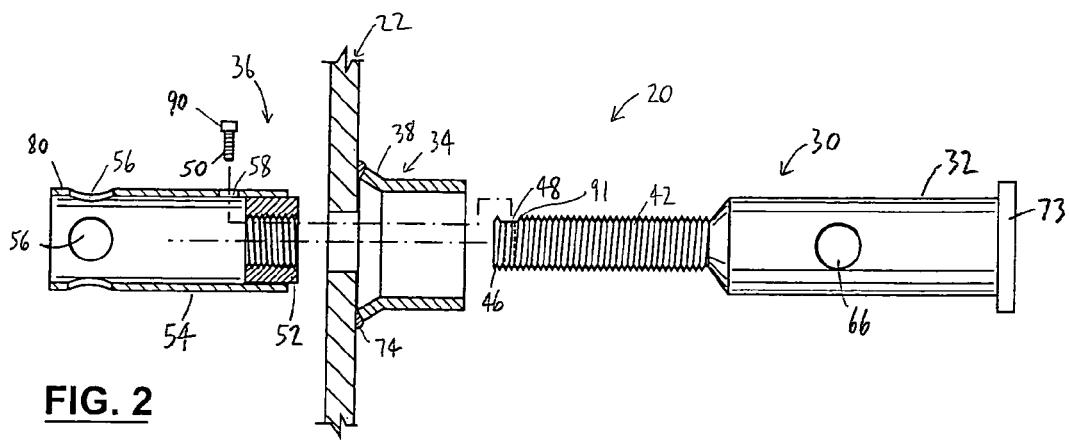
FIG. 2 is an exploded side view of the connecting device of FIG. 1 including a partial cross-section.

In the preferred embodiment, the bolt portion 42 includes a distal end 46 positioned distal to the body portion 32 (FIG. 2). The distal end 46 preferably includes a retaining pin hole 48 therein. The connecting device 20 preferably also includes a retaining pin 50 which is receivable in the retaining pin hole 48, as will be described.

Preferably, the fastener 36 includes an engagement portion 52, threaded so that the engagement portion 52 is threadably engageable with the bolt portion 42, and a fastener body portion 54 connected to the engagement portion 52 and extending therefrom. As can be seen in FIGS. 2–6, the fastener body portion 54 is preferably generally cylindrical and extends outwardly (i.e., to the left as shown in FIGS. 2–6) from the engagement portion 52. The fastener body portion 54 preferably is hollow, and includes end apertures 56 and a retaining pin aperture 58, as will be described.

The hitch receiver 24 could have a variety of known configurations. For convenience, the hitch receiver 24 shown in FIGS. 1–6 is of the relatively common type in which walls 60, 61, 62, 63 substantially define a cavity 64 therein in which the body portion 32 is receivable (FIG. 1). The walls 60, 61, 62, 63 typically are welded or otherwise formed together so that the cavity 64 has a substantially rectangular cross-section. Preferably, the hitch receiver 24 is made of steel or any other suitable material. The hitch receiver's walls 61, 63 preferably include at least one set of holes 65 which are substantially aligned with each other. The holes 65 are preferably positioned and sized to register with an anchor hole 66 located in the body portion 32, when the body portion 32 is received in the hitch receiver 24 and located in an anchor position (FIG. 4), in which the body portion 32 is couplable with the hitch receiver 24.

When the holes 65, 66 are substantially aligned, a large retainer pin 67 is receivable in the holes 65 and the anchor hole 66 to hold the body portion 32 stationary relative to the hitch receiver 24 (i.e., to couple the body portion 32 with the hitch receiver 24), as shown in FIGS. 3–6. As is known in the art, a cotter pin 68 is preferably attached to a first end 70 of the retainer pin 67 to hold the retainer pin 67 in the holes 65, 66 despite vibration of the connecting device 20 while the vehicle is travelling. In the preferred embodiment, the retainer pin 67 has a second end 71 which is bent relative to a central part 72 of the retainer pin 67. Other means for holding the retainer pin 67 in place and in the holes 65, 66 will be apparent to those skilled in the art.

As can be seen in FIGS. 1–6, the body portion 32 includes an end plate 73 which preferably fits within the walls 60, 61, 62, 63 of the hitch receiver 24 in a clearance fit. The end plate 73 is for positioning the base 30 so that it is disposed substantially coaxial with the hitch receiver 24, i.e., at least in the part of the base 30 proximal to the end plate 73. In the preferred embodiment, the body portion 32 is inserted into the hitch receiver cavity 64 through the outward end 26 with the end plate 73 leading (FIG. 3). When the anchor hole 66 is substantially aligned with the holes 65, the first end 70 of the retainer pin 67 is inserted therethrough until the first end 70 extends beyond the wall 63 (FIGS. 1, 6). The cotter pin 68 is then attached to the retainer pin 67, thereby securing the retainer pin 67 in position. The retainer pin 67, once secured in the holes 65 and the anchor hole 66, holds the body portion 32 stationary relative to the hitch receiver 24, serving to couple the body portion 32 with the hitch receiver 24.

The collar 34 is preferably attached to the accessory 22 by welding or other suitable means. In FIGS. 2–6, 6A, and 6B, the collar 34 is shown as being welded to the accessory 22 by weld material 74. As can be seen in FIG. 4, the collar 34 is inserted into the outward end 26 after the body portion 32 is secured in the hitch receiver 24. The collar 34 is positioned substantially coaxial with the bolt portion 42, and is slid into the outward end 26 over the bolt portion 42, so that the collar 34 is loosely disposed in the outward end 26, and not engaged with the outward end 26. Next, the nut 36 is threadably engaged with the bolt portion 42, starting at the distal end 46 thereof. In the preferred embodiment, the nut 36 comes into frictional contact with the accessory 22, and pushes the accessory 22 in the direction of arrow "A" in FIG. 5 until the stop portion 38 of the collar 34 engages the outward end 26. As can be seen in FIG. 6, once the stop portion 38 engages the outward end 26, further movement of the nut 36 and the accessory 22 inwardly (i.e., in the direction of arrow "A" in FIG. 5) is prevented by the stop portion 38.

As shown in FIGS. 5 and 6, in the preferred embodiment, the collar 34 engages the outward end 26 substantially along the periphery edge 40. This engagement, substantially all around the periphery edge 40, effectively limits the "wobble" to which the accessory 22 is subject, relative to the hitch receiver, as the vehicle with the hitch receiver travels. The engagement portion 52 should be tightened from time to time, as vibration due to travel may tend to loosen the engagement portion 52.

As can be seen in FIGS. 2–6, the nut 36 preferably includes the fastener body portion 54 and the engagement portion 52. The fastener body portion 54 extends outwardly (i.e., in the direction of arrow "B" in FIG. 6B) from the engagement portion 52, which threadably engages the bolt portion 42. The fastener body portion 54 includes a distal end 80 disposed distal to the engagement portion 52, and the fastener body portion 54 also preferably includes end apertures 56 disposed at the distal end 80 and the retainer pin aperture 58 disposed between the distal end 80 and the engagement portion 52. After the nut 36 has engaged the bolt portion 42 at the distal end 46 thereof and moved inwardly along the bolt portion 42 a preselected distance, the retainer pin aperture 58 is aligned with the threaded hole 48 in the bolt portion 42. Preferably, the small retainer pin 50 is threadably engageable in the hole 48. In the preferred embodiment, the pin 50 includes a head 90 which extends above a surface 91 of the bolt portion 42 when the pin 50 is positioned in the hole 48. As can be seen in FIGS. 3–5, the head 90 prevents loosening of the engagement portion 52 to the extent that the engagement portion 52 disengages from the bolt portion 42. The head 90 projects sufficiently above the surface 91 to prevent removal of the engagement portion 52 from the bolt portion 42. This feature is a significant safety feature, because the engagement portion 52 can, eventually, become loosened—i.e., if the engagement portion 52 is not tightened from time to time.

It will be appreciated by those skilled in the art that other arrangements are possible. For example, instead of a threaded pin, the pin 50 could be a roll pin (not shown) which is receivable in a hole (not shown) in an interference fit, such hole extending through the bolt 42. The roll pin, which would preferably be longer than the hole, would be hammered into the hole so that, once the roll pin is secured in the hole, parts of the pin extend beyond the surface 91 of the bolt portion 42, i.e., on opposite sides of the bolt portion 42. Alternatively, the connecting device could include a ring or the like attachable to the distal end 46 of the bolt portion 42 after the nut 36 has been engaged on the bolt portion 42.

The end apertures 56 are sized and positioned for receiving a bar (not shown) which can be used to tighten the nut 36 on the bolt portion 42. The bar is preferably long enough to provide sufficient leverage to a user (not shown) that the nut 36 can be tightened by the user with relatively little effort.

The collar 34 includes an interior part 92 configured to fit inside the hitch receiver 24 when inserted in the outward end 26. In addition, the stop portion 38 preferably includes an exterior part 94 which extends outside the outward end 26 from the interior part 92 when the collar 34 is urged inwardly against the outward end 26, for engaging the outward end 26. The exterior part 94 prevents inward movement of the collar 34 upon engagement thereof with the hitch receiver 24 (FIG. 5). The collar 34 is adapted to be coupled with the accessory 22 so that the accessory 22 is secured to the hitch receiver 24 upon the engagement of the collar 34 to the outward end 26 of the hitch receiver 24.

Figure 6A:
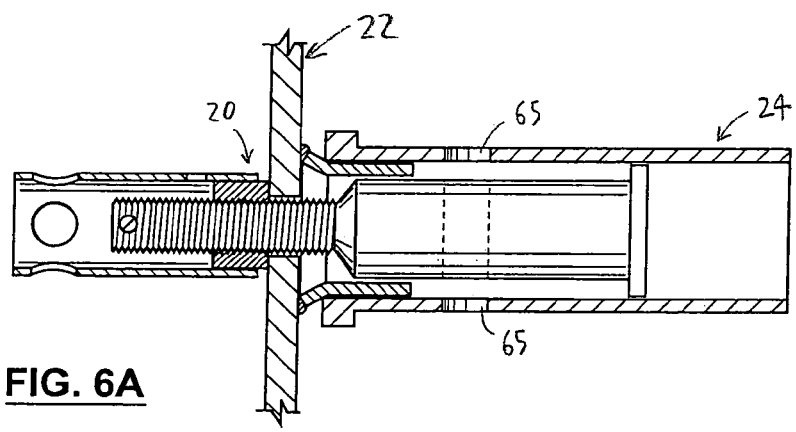
FIG. 6A is a top view of the connecting device of FIG. 5 in an assembled condition and decoupled from the hitch receiver, including a partial cross-section.
Figure 6B:
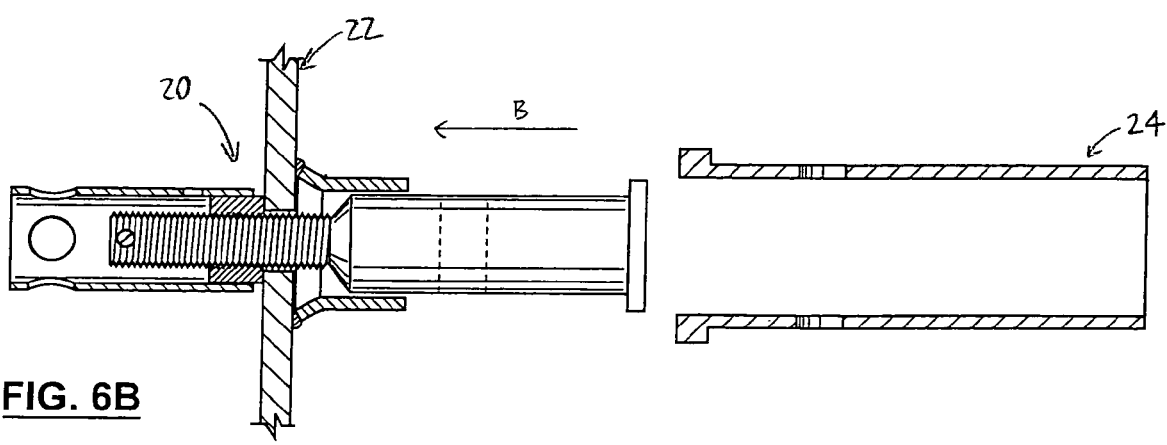
FIG. 6B is a top view of the connecting device of FIG. 6A in an assembled condition and removed from the hitch receiver, including a partial cross-section.

As shown in FIGS. 6A and 6B, the connecting device 20, once assembled, is conveniently removable from the hitch receiver 24. In practice, before the retainer pin 67 is removable, the nut 36 is loosened slightly. The cotter pin 68 is then removed, followed by removal of the retainer pin 67 (FIG. 6A). Upon the removal of the retainer pin 67, the connecting device 20 is decoupled from the hitch receiver 24, as shown in FIG. 6A. After the removal of the retainer pin 67, the connecting device 20, which is in an assembled condition, is removable from the hitch receiver 24 (FIG. 6B).

The ability to remove the connecting device 20 in an assembled condition from the hitch receiver 24 is useful because when the connecting device 20 is in the assembled condition, it can easily and quickly be reconnected with the hitch receiver 24. The reconnection steps are as follows. First, the body portion 32 is inserted into the hitch receiver 24, so that the holes 65, 66 are substantially aligned. The first end 70 of the pin 67 is then inserted through the holes 65, 66. Next, the cotter pin 68 is attached to the first end 70 of the retainer pin 67. Finally, the nut 36 is tightened until it causes the collar 34 to engage the outward end 26.

The components of the connecting device 20 may be made of various materials. Preferably, the connecting device 20 is made of steel, but it may be made of any suitable material, or materials.

Figure 7:
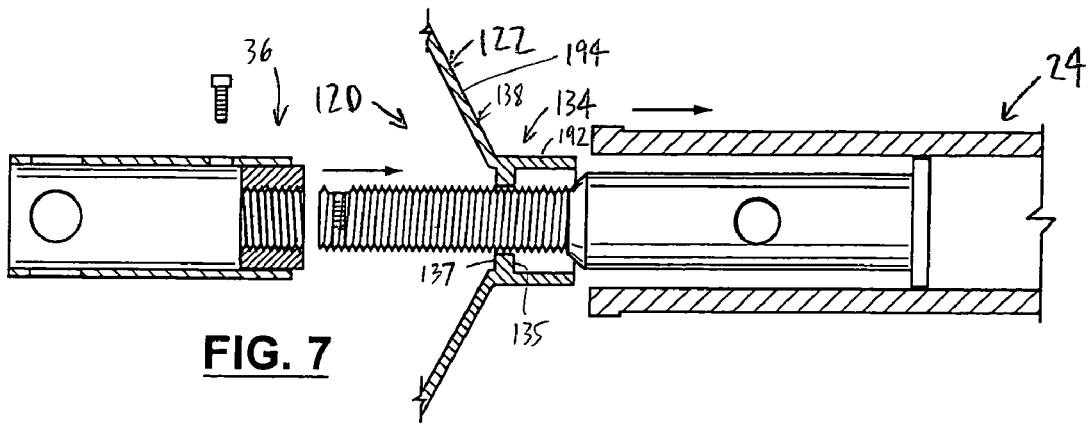
FIG. 7 is a side view of a base of an alternative embodiment of the connection device being received in the hitch receiver, including a partial cross-section.
Figure 8:
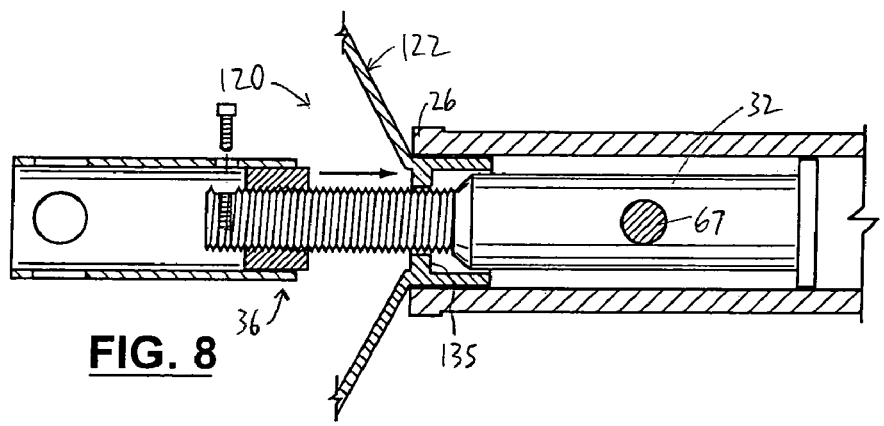
FIG. 8 is a side view of the connecting device of FIG. 7 showing the base coupled with the hitch receiver, including a partial cross-section.
Figure 9:
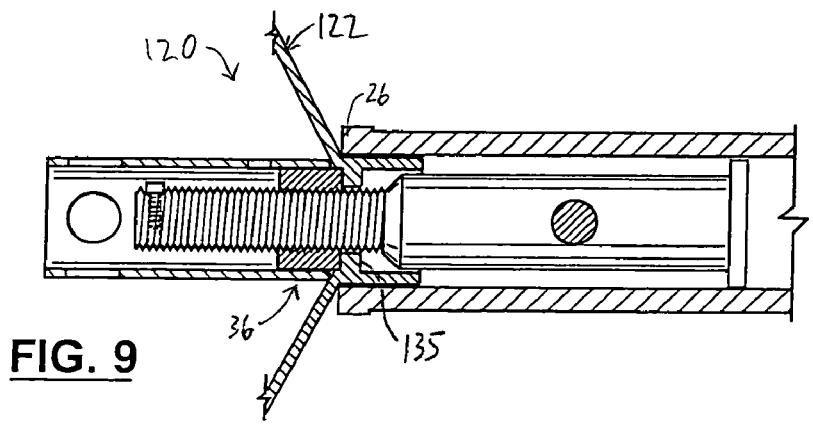
FIG. 9 is a side view of a collar of the connecting device of FIG. 7 engaged with an outward end of the hitch receiver in an interference fit, including a partial cross-section.

An alternative embodiment of the invention is shown in FIGS. 7–9. In such drawings, elements are numbered so as to correspond to like elements shown in FIGS. 1–6, 6A, and 6B.

In the alternative embodiment of the invention, a connecting device 120 includes a collar 134 which is formed as an integral part of an accessory 122, or attached to the accessory 122, and a washer portion 135 against which the nut 36 pushes, as the nut 36 is tightened (FIGS. 8 and 9). The collar 134 includes the washer portion 135. Accordingly, the nut 36 is operable to come into frictional driving contact with the collar 134 for urging the collar 134 against the outward end 26 of the hitch receiver 24. The alternative embodiment 120 demonstrates that a variety of configurations of the collar and the accessory, as well as other components, may be used, and are within the scope of the invention as claimed.

The collar 134 preferably includes an interior part 192 configured to fit inside the hitch receiver 24 when inserted in the outward end 26. The collar 134 also includes a stop portion 138 which engages the outward end 26, preventing further movement of the collar 134 inwardly. The stop portion 138 preferably includes an exterior part 194 which extends outside the outward end 26 from the interior part 192 when the collar 134 is urged against the outward end 26, for engaging the outward end 26. The exterior part 194 prevents inward movement of the collar 134 upon engagement thereof with the hitch receiver 24.

The washer portion 135 preferably extends inwardly, with a face 137 adapted to receive the nut 36 when the nut 36 is tightened. Although various forms are possible, the washer portion 135 preferably projects inwardly at substantially 90° relative to the interior part 192.

It will be appreciated by those skilled in the art that the invention can take many forms, and that such forms are within the scope of the invention as claimed. For example, various means for tightening the nut may be apparent to those skilled in the art. Also, in the alternative embodiment, the washer portion may be formed separately from the collar, and fit within the collar when pushed inwardly by the nut. Therefore, the spirit and scope of the appended claims should not be limited to the descriptions of the preferred versions contained herein.

I claim:

1. A connecting device for connecting an accessory to a hitch receiver, the hitch receiver having an outward end defining an opening, the connecting device comprising:
    a base with a body portion receivable in the hitch receiver, the body portion being adapted for coupling with the hitch receiver to locate the base in a predetermined position therein;
    a collar for engaging the outward end of the hitch receiver in an interference fit upon engagement of the collar with the outward end, the collar being coupled wit the accessory;
    a fastener operatively connected with the base for urging the collar against the outward end to cause the collar to engage the outward end;
    the connecting device being adapted to connect the accessory to the hitch receiver upon engagement of the collar with the outward end of the hitch receiver;
    the base including a threaded bolt portion extending from the body portion such that at least a part of the threaded bolt portion projects beyond the outward end of the hitch receiver when the body portion is coupled to the hitch receiver; and
    the fastener comprising a nut threadably engageable with the bolt portion for urging the collar against the outward end of the hitch receiver when the nut is moved inwardly on the bolt portion, to engage the collar with the outward end in an interference fit, and for loosening the collar when the nut is moved outwardly on the bolt portion, to disengage the collar from the outward end, the connecting device being in an assembled state when the nut is on the bolt portion and the collar is disengaged from the outward end.

2. A connecting device according to claim 1 in which; the bolt portion includes a distal end positioned distal to the body portion; the distal end includes a retaining pin hole therein; and the connecting device additionally includes a retaining pin receivable in the retaining pin hole, for retaining the nut on the bolt portion between the body portion and the retaining pin.

3. A connecting device according to claim 1 in which the body portion is releasably coupled with the hitch receiver such that, when the connecting device is in the assembled state, the body portion is releasable from the hitch receiver.

4. A connecting device far connecting an accessory to a hitch receiver, the hitch receiver having an outward end, the connecting device comprising:
    a base comprising a body portion receivable in the hitch receiver, the body portion being adapted for coupling with the hitch receiver to locate the base in a predetermined position in the hitch receiver;
    the base additionally comprising a threaded bolt portion extending outwardly from the body portion and beyond the outward end of the hitch receiver when the body portion is coupled with the hitch receiver;
    a nut threadably engageable with the bolt portion;
    a collar configured to engage the outward end of the hitch receiver in an interference fit such that the collar is held stationary relative to the hitch receiver when the collar is engaged wit the hitch receiver, the collar being coupled with the accessory; and
    the nut being operable to cause the collar to be urged against the outward end when the nut is tightened on the bolt portion, and operable to cause the collar to be released when the nut is loosened.

5. A connecting device according to claim 4 in which the collar comprises a stop portion for stopping movement of the collar inwardly into the outward end.

6. A connecting device according to claim 5 in which the body portion is detachable from the hitch receiver, the accessory remaining attached to the collar when the body portion is detached from the hitch receiver.

7. A connecting device according to claim 6 in which the collar is adapted to engage the outward and along substantially a periphery edge defining the outward end in an interference fit.

8. A connecting device according to claim 7 in which the collar comprises an interior part configured to fit inside the opening at the outward end of the hitch receiver and a flange part extending outside the outward end from the interior part when the collar is engaged in the outward end.

9. A connecting device according to claim 7 in which the collar comprises an interior part configured to fit inside the opening at the outward end of the hitch receiver and an excurvate part extending outside the outward end from the interior part when the collar is engaged in the outward end.

10. A collar for securing an accessory to a bitch receiver, the hitch receiver having an outward end defining an opening, the collar comprising:
    an interior part configured to fit inside the opening;
    an exterior part extending outside the outward end from the interior part when the collar is urged inwardly against the outward end for engaging the outward end, the exterior tart preventing inward movement of the collar upon engagement thereof;
    the collar being adapted to be coupled with the accessory such that the accessory is secured to the hitch receiver upon the engagement of the collar to the outward end of the hitch receiver; and the exterior part being-adapted to engage the outward end substantially along a periphery edge disposed around the opening in an interference fit when the collar engages the outward end.

11. A connecting device according to claim 1 in which the collar comprises a stop portion for stopping movement of the collar inwardly into the outward end.

12. A connecting device according to claim 1 in which the collar is adapted to engage the outward end substantially along a periphery edge disposed around the opening in an interference fit when thy collar is urged against the outward end.

* * * * *